Dec. 15, 1959    R. E. HULSEY ET AL    2,917,638
PROTECTIVE SYSTEM FOR ALTERNATING CURRENT GENERATORS
Filed April 24, 1958
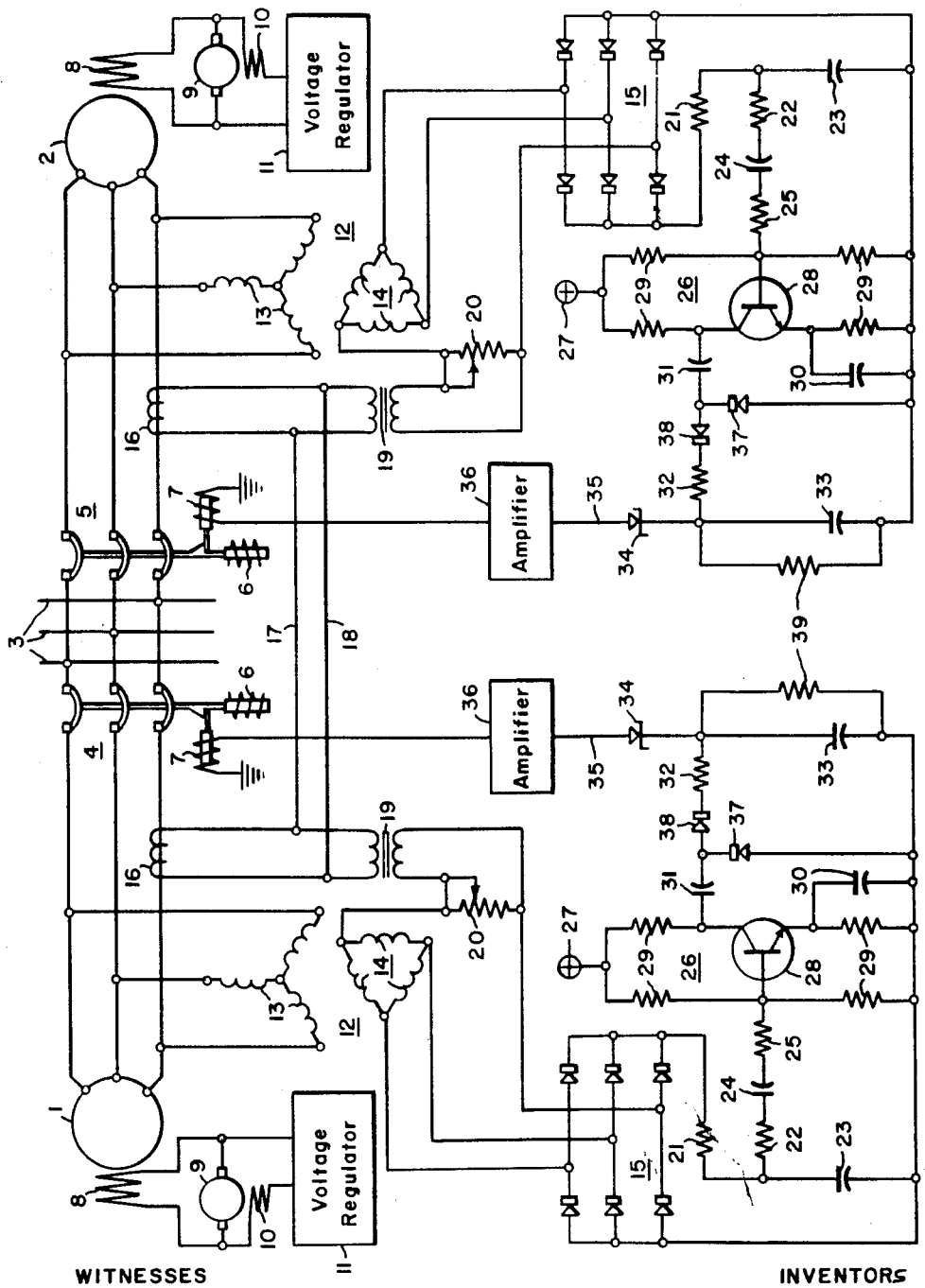
WITNESSES
INVENTORS
Ronald E. Hulsey, James R. Reeder &
Niles F. Schuh
BY
ATTORNEY

United States Patent Office

2,917,638
Patented Dec. 15, 1959

2,917,638

PROTECTIVE SYSTEM FOR ALTERNATING CURRENT GENERATORS

Ronald E. Hulsey, James R. Reeder, and Niles F. Schuh, Lima, Ohio, assignors to Westinghouse Electric Corporation, East Pittsburgh, Pa., a corporation of Pennsylvania Application April 24, 1958, Serial No. 730,693

8 Claims. (Cl. 307—86)

The present invention relates to protection against instability in an alternating current generator system, and more particularly to a protective system for detecting such instability and for effecting disconnection of the generator causing the instability.

In alternating current generator systems, instability may occur as a result of faulty or unstable operation of a voltage regulator, or for other reasons such as failure of an incoming generator in a parallel system to synchronize properly with the other generators. When such instabibility occurs, sustained oscillations of the output voltage of the affected generator occur, and in a system in which two or more generators are operated in parallel, load instability may also occur in which oscillations or swings of reactive load current between generators occur. Such instability is, of course, highly undesirable, and this is especially so in an aircraft electrical system, since the accuracy of navigational and fire control equipment is dependent upon the stability of the electrical system from which such equipment is supplied. It is necessary, therefore, to detect the occurrence of voltage or load instability and, in a parallel system, to select and disconnect the generator which is causing the instability, preferably with a suitable time delay to prevent operation on transient voltage or load swings such as may be caused by load switching.

The principal object of the present invention is to provide a protective system for detecting instability in an alternating current generator system and for effecting disconnection of the generator causing the instability after a suitable time delay.

Another object of the invention is to provide a protective system for detecting voltage or load instability in a system of alternating current generators operating in parallel and for selecting the generator which is causing the instability.

A further object of the invention is to provide a completely static system for detecting instability in a system of alternating current generators operating in parallel, and for selecting the generator causing the instability and providing an output signal after a time delay which varies inversely with the magnitude of the instability.

Other objects and advantages of the invention will be apparent from the following detailed description, taken in connection with the accompanying drawing, the single figure of which is a schematic diagram showing an illustrative embodiment of the invention.

A preferred embodiment of the invention is shown in the drawing applied to a generator system comprising two three-phase alternating current generators 1 and 2 connected in parallel to a load bus 3 by means of circuit breakers 4 and 5, respectively. Each of the circuit breakers 4 and 5 has a closing coil 6, which may be controlled manually or automatically in any desired manner, and a trip coil 7 controlled as described hereinafter and which may also be controlled manually or by any additional automatic means as desired. The particular generator system shown for the purpose of illustration is of a type frequently used for supplying alternating current electrical systems in large airplanes, although the usefulness of the invention is obviously not restricted to this particular type of system. It will also be apparent that the invention is applicable to systems having more than two generators in parallel.

The generators 1 and 2 are shown as being identical three-phase machines and each generator has a field winding 8 supplied with direct current excitation from an exciter 9, which is shown for the purpose of illustration as a self-excited direct current generator having a shunt field winding 10. The excitation of the exciter 9 is controlled by a voltage regulator 11 which may be of any suitable type and which has not been shown in detail since it is not a part of the present invention. It is to be understood that the excitation system shown is merely illustrative and is to be taken as representing any suitable type of excitation system for supplying direct current excitation to the generator under the control of a voltage regulator of any suitable type which senses the output voltage of the generator and controls the exciter to maintain substantially constant generator voltage. The regulator 11 is preferably also controlled in any suitable manner to normally maintain substantially equal division of reactive load between the generators.

As previously mentioned, instability may occur in such a generator system due to faulty or unstable operation of one of the voltage regulators, or to other causes, resulting in sustained oscillation of the output voltage of the affected generator, and oscillation of reactive load between the generators may also occur. In order to detect such voltage oscillation, each generator is provided with a sensing transformer 12 having three-phase primary windings 13 connected to the generator terminals as shown. The secondary windings 14 of the transformer 12 provide a three-phase output voltage which is proportional to the generator voltage. The output of the sensing transformer 12 is connected to a three-phase rectifier bridge 15 which provides a unidirectional output proportional to the sum, and thus to the average, of the three-phase output voltages of the sensing transformer 12. Thus, the output current of the rectifier 15 is a unidirectional current proportional to the average of the three phase voltages of the generator 1, and if oscillation of the generator voltage occurs, the magnitude of the output voltage and current of the rectifier 15 will reflect the oscillation of the generator voltage, so that the rectifier output will contain a proportionate modulation, or regular variation in magnitude. Thus, instability of the voltage of the generator can be detected by detecting modulation of the output of the rectifier 15.

As indicated above, oscillation of reactive load between generators may also occur, and it is necessary to provide means for selecting the particular generator which is causing the instability so that the good generators will not be disconnected from the system. For this purpose, a reactive load division sensing means is provided. This sensing means might be of the type disclosed in a patent to Keith et al., No. 2,717,318, issued September 6, 1955, but in the preferred embodiment of the invention shown in the drawing there is utilized an improved reactive load sensing circuit of the type disclosed and claimed in a copending application of J. R. Reeder et al., Serial No. 726,131, filed April 3, 1958, now Patent No. 2,883,561, issued April 21, 1959.

The reactive load division sensing means includes a current transformer 16 connected in one phase lead of each generator, as shown, to be energized by the generator output current. The secondaries of the current transformer 16 are connected in a loop circuit by conductors 17 and 18. It will be seen that under normal conditions, when the load currents of the generators are equal, no current will flow in the current transformer loop. If the generator output currents become unequal, however, a circulating current will flow which may contain both reactive current components and real load current components, or which may consist only of reactive current or of real load current. Since the division of real load between the generators is determined only by their relative speeds, instability affects only the reactive current components and may cause oscillation of the reactive load between generators. The reactive load current components, therefore, are used to modify the output voltages of the sensing transformers 12 in such a manner as to select the generator causing the instability.

For this purpose, a saturating current transformer 19 associated with each generator is connected to the loop circuit 17, 18. The current transformer 19 is thus energized by current flowing in the loop circuit which, as previously explained, is proportional to the difference in output currents of the generators. The output voltage of the current transformer 19 is applied to an adjustable resistor 20 which is connected, as shown, in series with one phase of the output of the sensing transformer 12. Thus, the voltage across the resistor 20 is added as a bias voltage to the output of the sensing transformer and modifies the voltage applied to the rectifier 15.

It can be shown, as more fully explained in the above-mentioned patent and application, that the phase relations of the reactive current components in the current transformer loop and the output voltages of the sensing transformers 12 are such that the bias voltage of the resistor 20 adds to the output voltage of the sensing transformer 12 of the generator which is causing the instability. That is, on the generator causing the instability, the reactive load current component will be in phase with the voltage modulation of the generator, so that the bias voltage of the resistor 20 adds to the output of the sensing transformer 12 and thus increases the modulation of the output of the rectifier 15. On the good generators, the reactive current components will be 180° out of phase with the voltage modulation caused by the faulty generator, and thus the bias voltage of the resistor 20 of each good generator subtracts from the output of its sensing transformer 12 and reduces, or may substantially eliminate, the modulation of the output of the rectifier 15. The reactive load sensing loop therefore provides the necessary selectivity, since in case of oscillation of reactive load between generators, it senses the unequal division of reactive load and increases the modulation of the output of the rectifier 15 of the faulty generator and reduces or substantially eliminates any modulation of the output of the rectifiers 15 of the good generators of the system. Thus, selectivity is achieved in a very effective manner.

Each generator is provided with means for detecting modulation of the output of its rectifier 15 and for providing an output signal after a suitable time delay. For this purpose, the output of each rectifier 15 is connected to a filter circuit which may consist of reactors 21 and 22 and a capacitor 23, connected as shown to form a filter circuit which is designed to pass a predetermined range of frequencies of modulation of the output current of the rectifier 15 but which must not pass the normal ripple in the rectifier output. It will be understood that any suitable type of filter circuit may be utilized for this purpose. A capacitor 24 is connected to the output of the filter circuit to block the flow of direct current, and a resistor 25, which may be made adjustable if desired, is connected in series with the capacitor 24 to determine the minimum magnitude of modulation to which the system will respond. Thus, the filter circuit provides an output when modulation within a predetermined range of frequencies and in excess of a predetermined magnitude is present in the output of the rectifier 15.

The output of the filter circuit is preferably amplified by a static amplifier circuit 26 which may be of any suitable type. The amplifier 26 is shown as a single-stage transistor amplifier supplied from any suitable direct current source, indicated at 27, and comprising a transistor 28 having its base and emitter connected across the output of the filter circuit and provided with the usual biasing resistors 29, and preferably also a capacitor 30 connected as shown for reducing degenerative feedback at low frequencies.

The output of the amplifier 26 is coupled by means of a capacitor 31 and a half-wave rectifier 38 to a time delay circuit which includes a resistor 32 and a capacitor 33. A diode 37 is connected as shown to prevent charging of the capacitor 31. It will be seen that the capacitor 33 is charged by the positive peaks of the output of the amplifier 26 at a rate determined by the magnitude of the amplifier output and thus tends to integrate the amplifier output. The capacitor 33 is connected to a Zener diode 34. It will be understood that this is a semiconductor diode, preferably a silicon diode, which substantially blocks the flow of current in the reverse direction as long as the voltage is below the break-down voltage of the diode. When this voltage is exceeded, the diode becomes highly conductive and permits free flow of current in the reverse direction until the voltage is again reduced below the break-down value. Thus, when modulation occurs in the output of the rectifier 15 in the predetermined frequency range and in excess of the predetermined magnitude, the amplified output of the filter circuit charges the capacitor 33, which builds up its charge until the voltage of the capacitor exceeds the break-down voltage of the diode 34. When this occurs, an output signal appears on the conductor 35 indicating the existence of instability.

The signal thus appearing on conductor 35 may be utilized for any desired control or indicating purpose. Preferably, as shown in the drawing, this output signal is used to effect tripping of the circuit breaker 4 by means of a static amplifier 36 of any suitable type, the output of which is connected to the trip coil 7 to effect tripping of the circuit breaker. If necessary, or desired, the field excitation of the generator 1 may also be interrupted simultaneously by any suitable means. It will be understood that the amplifier 36 represents any suitable control device, preferably a static device such as an amplifier or a flip-flop circuit, for effecting tripping of the circuit breaker or any other desired operation.

Thus, the occurrence of modulation of predetermined frequency and magnitude in the output of the rectifier 15 causes an output signal to appear on the conductor 35 after a predetermined time delay. The time delay is determined by the length of time required to charge the capacitor 33 to a voltage equal to the break-down voltage of the diode 34 and this time is, of course, dependent upon the magnitude of the modulation so that inverse time delay characteristics are obtained. The time delay is necessary to prevent operation on transient oscillations or voltage swings such as may result from normal load switching operations and if such oscillations disappear before the time delay period is completed, no output signal occurs. The capacitor 33 is partially charged under these conditions and a resistor 39 is connected across the capacitor 33, as shown, to provide a discharge path for the capacitor, so that any partial charge on the capacitor 33 is dissipated immediately after the modulation which caused it disappears. Thus, the capacitor 33 is not left partially charged and the time delay period on a subsequent operation is not affected.

It will now be apparent that a protective system has been provided for detecting instability in an alternating current generator system and for selecting the generator causing the instability in a parallel system. If the protective system is applied to a single generator operating alone, the current transformer 19 and resistor 20 may be omitted and the modulated sensing circuit responds directly to voltage modulation of the sensing transformer 12. If one generator in a parallel system is isolated from the system to operate alone, the same result may be obtained by short-circuiting the primary of the transformer 19. For parallel operation, the system provides selectivity in the manner described above, since modulation detected by the system is increased for the generator causing the instability, while the modulation of the sensing transformers of the good generator or generators is reduced or eliminated so that their modulation detecting circuits are not actuated. In this way effective and reliable selectivity is obtained.

Thus, a reliable protective system for detecting instability has been provided which has the advantages of a completely static system so that it can be made small and highly reliable and does not require the use of accurately calibrated relays or other devices involving moving parts, which are undesirable for aircraft use.

A preferred embodiment of the invention has been shown and described for the purpose of illustration, but it will be understood that various other embodiments and modifications are possible within the scope of the invention.

We claim as our invention:

1. A protective system for an alternating current generator comprising transformer means for providing a voltage proportional to the generator voltage, rectifier means connected to the transformer means to provide a unidirectional output current, filter means connected to the rectifier means and adapted to pass only a predetermined range of frequencies of modulation of said output current, amplifier means for amplifying the output of the filter means, and time delay means connected to the output of the amplifier means for providing an output signal.

2. A protective system for an alternating current generator comprising transformer means for providing a voltage proportional to the generator voltage, rectifier means connected to the transformer means to provide a unidirectional output current, filter means connected to the rectifier means and adapted to pass only a predetermined range of frequencies of modulation of said output current, and control means including amplifier means and time delay means for effecting disconnection of the generator in response to the output current of the filter means.

3. A protective system for detecting instability in a system of alternating current generators operating in parallel, said protective system comprising means associated with each generator for producing an output voltage proportional to the generator voltage, means for detecting modulation of said output voltage in excess of a predetermined magnitude, and means responsive to reactive load current oscillation between generators for modifying the output voltages corresponding to the several generators so that only the modulation detecting means of the generator causing the oscillation is caused to operate.

4. A protective system for detecting instability in a system of alternating current generators operating in parallel, said protective system comprising means associated with each generator for producing an output voltage proportional to the generator voltage, means for detecting modulation of said output voltage in excess of a predetermined magnitude, and means responsive to reactive load current oscillation between generators for applying bias voltages to the output voltages corresponding to the several generators in such phase relation that only the modulation detecting means of the generator causing the oscillation is caused to operate.

5. A protective system for detecting instability in a system of alternating current generators operating in parallel, said protective system comprising means associated with each generator for producing an output voltage proportional to the generator voltage, means for detecting modulation of said output voltage in excess of a predetermined magnitude, means for deriving a bias voltage for each generator in response to difference in reactive load current between the generators, and means for applying said bias voltages to the output voltages corresponding to the respective generators in such phase relation that the bias voltage for the generator causing the difference in reactive load current adds to the output voltage and the bias voltages for the other generators subtract from the output voltages.

6. A protective system for detecting instability in a system of alternating current generators operating in parallel, said protective system comprising transformer means associated with each generator for producing an output voltage proportional to the generator voltage, rectifier means connected to each of said transformer means to provide a unidirectional output current, filter means connected to each rectifier means and adapted to pass only a predetermined range of frequencies of modulation in excess of a predetermined magnitude of said output current, control means responsive to the output of each filter means for producing an output signal after a time delay, and means responsive to reactive load current oscillation between generators for modifying the output voltages of the transformer means so that modulation in excess of the predetermined magnitude occurs only in the output current of the rectifier means associated with the generator causing the oscillation.

7. A protective system for detecting instability in a system of alternating current generators operating in parallel, said protective system comprising transformer means associated with each generator for producing an output voltage proportional to the generator voltage, rectifier means connected to each of said transformer means to provide a unidirectional output current, filter means connected to each rectifier means and adapted to pass only a predetermined range of frequencies of modulation in excess of a predetermined magnitude of said output current, control means responsive to the output of each filter means for producing an output signal after a time delay, and means responsive to reactive load current oscillation between generators for applying bias voltages to the output voltages of the transformer means in such phase relation that modulation in excess of the predetermined magnitude occurs only in the output current of the rectifier means associated with the generator causing the oscillation.

8. A protective system for detecting instability in a system of alternating current generators operating in parallel, said protective system comprising transformer means associated with each generator for producing an output voltage proportional to the generator voltage, rectifier means connected to each of said transformer means to provide a unidirectional output current, filter means connected to each rectifier means and adapted to pass only a predetermined range of frequencies of modulation in excess of a predetermined magnitude of said output current, control means responsive to the output of each filter means for producing an output signal after a time delay, means for deriving a bias voltage for each generator in response to difference in reactive load current between the generators, and means for applying said bias voltages to the output voltages of the transformer means in such phase relation that the bias voltage for the generator causing the difference in reactive load current adds to the output voltage and the bias voltages for the other generators subtract from the output voltages.

References Cited in the file of this patent
UNITED STATES PATENTS 1,994,900    Shand _____ Mar. 19, 1935